US007423769B2

(12) United States Patent
Yu

(10) Patent No.: US 7,423,769 B2
(45) Date of Patent: Sep. 9, 2008

(54) GRAPHICAL USER INTERFACE

(75) Inventor: Zhongming Yu, Redwood City, CA (US)

(73) Assignee: Ricoh Company, Ltd., Tokyo (JP)

( * ) Notice: Subject to any disclaimer, the term of this patent is extended or adjusted under 35 U.S.C. 154(b) by 959 days.

(21) Appl. No.: 10/781,670

(22) Filed: Feb. 20, 2004

(65) Prior Publication Data
US 2004/0223167 A1    Nov. 11, 2004

Related U.S. Application Data

(62) Division of application No. 09/432,409, filed on Nov. 2, 1999, now Pat. No. 6,707,568.

(51) Int. Cl.
*G06F 15/00* (2006.01)
*B41F 1/00* (2006.01)
(52) U.S. Cl. ............ 358/1.1; 358/1.15; 358/1.13
(58) Field of Classification Search ........... 358/1.1, 358/1.6, 1.9, 1.12, 1.13, 1.15, 462
See application file for complete search history.

(56) References Cited

U.S. PATENT DOCUMENTS

| 5,559,933 | A | | 9/1996 | Boswell |
| 5,749,024 | A | | 5/1998 | Young |
| 5,754,743 | A | * | 5/1998 | Taraki et al. ............ 358/1.9 |
| 5,838,317 | A | | 11/1998 | Bolnick et al. |
| 6,341,018 | B1 | * | 1/2002 | Vidyanand et al. ........ 358/1.18 |
| 6,433,801 | B1 | | 8/2002 | Moon et al. |
| 6,614,546 | B1 | | 9/2003 | Kurozasa |
| 6,661,526 | B1 | * | 12/2003 | Daly et al. ............ 358/1.13 |
| 6,707,568 | B1 | * | 3/2004 | Yu ............ 358/1.15 |
| 7,102,768 | B2 | * | 9/2006 | Daly et al. ............ 358/1.13 |
| 2004/0032611 | A1 | * | 2/2004 | Daly et al. ............ 358/1.13 |
| 2005/0052700 | A1 | * | 3/2005 | Mackenzie et al. ........ 358/1.18 |
| 2005/0225789 | A1 | * | 10/2005 | Ferlitsch ............ 358/1.13 |
| 2006/0028667 | A1 | * | 2/2006 | Saito ............ 358/1.13 |
| 2006/0187479 | A1 | * | 8/2006 | Kikuchi ............ 358/1.13 |
| 2006/0221382 | A1 | * | 10/2006 | Sedky et al. ............ 358/1.15 |
| 2007/0165260 | A1 | * | 7/2007 | Fransazov ............ 358/1.13 |
| 2007/0268527 | A1 | * | 11/2007 | Naota ............ 358/462 |

FOREIGN PATENT DOCUMENTS

| EP | 0 694 834 | | 1/1996 |
| EP | 1100002 | A2 * | 5/2001 |
| JP | 4-191757 | | 7/1992 |

(Continued)

*Primary Examiner*—Kimberly A Williams
(74) *Attorney, Agent, or Firm*—Oblon, Spivak, McClelland, Maier & Neustadt, P.C.

(57) ABSTRACT

A printer filter including a companion script file and which filters a standard printer data stream to perform a user-specified print job. In particular, the filter is a computer program which may access other programs or data files, and which reads a standard printer data stream, transforms the input in accordance with instructions contained within the computer program, and then outputs the filtered or transformed information to the printer. The present invention also provides a graphical user interface to assist a user in operating the computer program. In particular, the graphical user interface includes a parent window having a display control which list a possible filters to be selected, along with a plurality of other display controls to assist the user in operating the computer program product.

18 Claims, 14 Drawing Sheets

FOREIGN PATENT DOCUMENTS

| | | |
|---|---|---|
| JP | 6-214862 | 8/1994 |
| JP | 7-261868 | 10/1995 |
| JP | 8-166855 | 6/1996 |
| JP | 10-312251 | 11/1998 |
| JP | 11-84948 | 3/1999 |
| JP | 11-175258 | 7/1999 |
| JP | 11-296217 | 10/1999 |

* cited by examiner

GRAPHICAL USER INTERFACE

CROSS-REFERENCE TO RELATED APPLICATION

This application is a division of application Ser. No. 09/432,409, filed on Nov. 2, 1999, which is incorporated herein by reference.

BACKGROUND OF THE INVENTION

1. Field of the Invention

The present invention relates to a printer which is capable of printing a plurality of user-specified print jobs, and more particularly to a computer program product which filters a standard printer data stream to perform the user-specified print job. The present invention also relates to a graphic user interface which may be included with the computer program product.

2. Discussion of the Background

One of the increasing demands placed on computer related equipment in both the home, school and work environments is an increased flexibility to perform a variety of tasks.

Currently, printers are utilized to print reports, facsimiles, books, pamphlets, overlays, labels, graphics, etc. Each of these items are best presented in a unique user-specified format on papers and/or materials as decided by the user.

Currently, each printer includes a printer driver which is loaded onto a computer. Then, a user of the computer can print a selected document or other item using the printer's printer driver. However, printer manufacturers are constantly required to update printer drivers to meet the expanding market needs, which results in higher costs.

Further, a user using a particular printer is limited in the amount of print options. For example, standard print drivers allow a user to print on different paper sizes, to print in a landscape or portrait format, etc. Thus, with a standard print driver, the user is limited to these options. However, consumers require a printer which is capable of printing a variety of print jobs. Currently, printer manufacturers intermittently develop new print drivers in an attempt to meet this demand.

In more detail, FIG. 1 illustrates a conventional set-up of a computer 2 and a printer 6 attached via a cable and/or other network 4. The printer 6 includes a connection port 7 for attaching the cable and/or other network 4 to the printer 6. Thus, a user using the computer 2 can select an item or other object to be printed on the printer 6.

FIG. 2 illustrates a block diagram of a conventional application 10 interfacing the printer 6. The conventional application 10 is hosted on an operating system 14 resident on the computer 2. When the user invokes a print command from the application 10, the document or other item to be printed is communicated to a printer driver 12. The printer driver 12 is a printer and operating system specific software interface. The operating system 14 sends signals in accordance with instructions from the printer driver 12 to the printer port and/or network card 18 via a connection 16, thus placing signals corresponding to the document or other item to be printed on the cable and/or other network 4 connected to the printer 6.

However, as discussed above, the print options available to the user are limited to those which are supplied with the printer driver 12 loaded onto the computer 2. Thus, if the user wishes to have a print option which is not included in the printer driver 12, the user must purchase or obtain and load onto the computer 2 a new printer driver having the desired print option. This is disadvantageous because the installation and configuration of a printer driver on a computer is cumbersome, time-consuming, and generally requires special instructions and/or a qualified technician.

SUMMARY OF THE INVENTION

Accordingly, one object of the present invention is to solve the above-noted problems.

Another object of the present invention is to provide a printer which is capable of printing a plurality of user-specified print jobs.

Yet another object of the present invention is to provide a computer program product, which filters a standard printer data stream to perform the user-specified print job.

Still another object of the present invention is to provide a graphic user interface which may be included with the computer program product.

Another object of the present invention is to provide a method of printing using a computer program product which filters the standard print data stream to perform the user-specified print job.

To achieve these and other objects, the present invention provides a filter which filters a standard printer data stream to perform a user-specified print job. The filter is typically a computer program, which receives data output from a printer driver, filters or transforms the received data in some desired way, and then outputs the filtered or transformed data stream to the printer.

The present invention also provides a graphical user interface to assist a user in operating the computer program. In particular, the graphical user interface according to the present invention includes a plurality of pop-up menus having various display controls to control the operation of the computer program.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

According to the present invention, it is possible to select a filter corresponding to a desired print option, and then print a document or other item based on this filter. A filter is typically a computer program which may access other programs or data files. In addition, a filter may be a program or set of features within a program that reads a standard or designated input, transforms the input in some desired way, and then outputs the filtered or transformed information. For example, the filter may be used to print date/time stamps as footnotes, print book pages, cover out confidential words or clauses in a document, print plural pages on a tabloid size paper, interleave transparencies with paper, perform debugging operations, etc. Examples of output products produced by filters according to the present invention are illustrated in FIGS. 8A-8F and will be described in more detail later.

The filter according to the present invention is not limited to these options, but may include a variety of options, thereby presenting the user with great flexibility to print a variety of documents, layouts, types, etc. Further, the printer manufacturer is also benefited as it may produce a standardized printer driver and provide a plurality of filters to tailor the printer driver to a user's need and the current market demand. This saves the printing manufacturer in having to constantly upgrade printer drivers to meet market demands.

Figure 1:
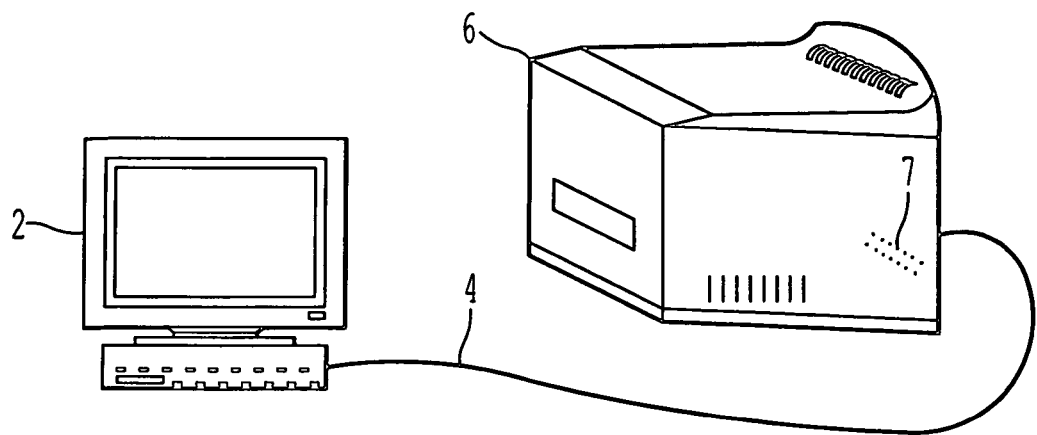
FIG. 1 illustrates a conventional computer connected to a printer.
Figure 2:
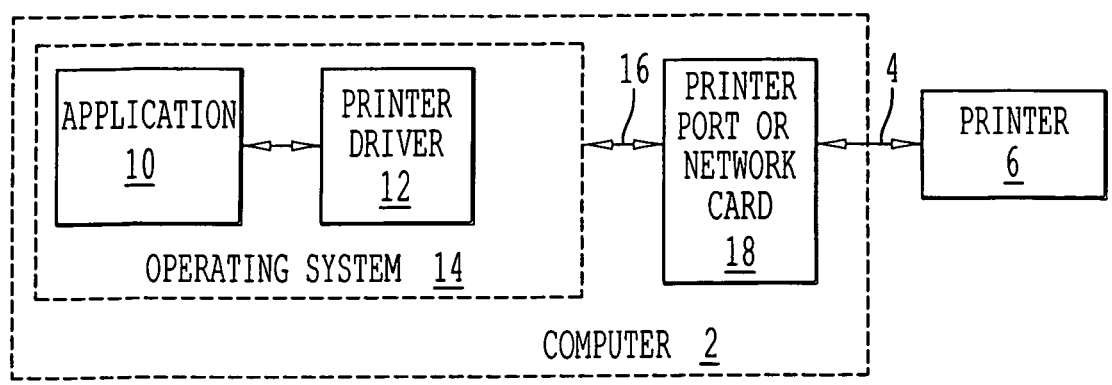
FIG. 2 is a block diagram illustrating functional components and data passed between a software application and a printer.
Figure 3A:
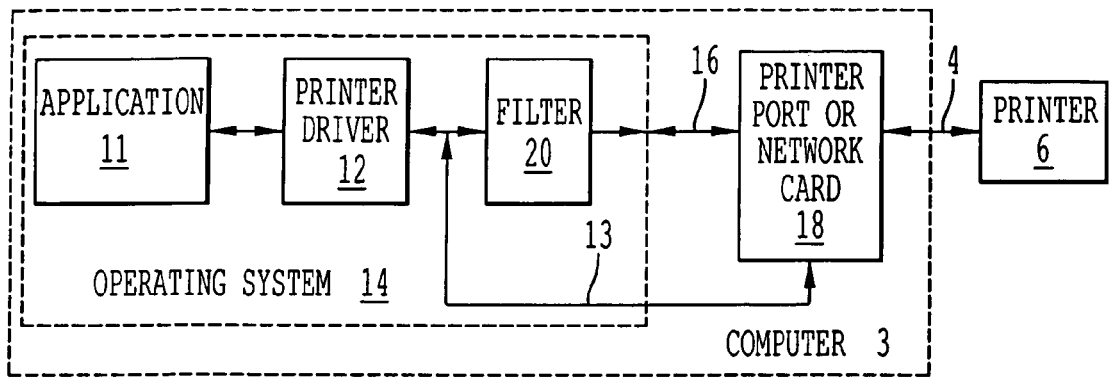
FIG. 3A is a block diagram illustrating functional components and data passed between a software application and a printer according to the present invention.

Referring now to the drawings, wherein like reference numerals designate identical or corresponding parts throughout the several views, FIG. 3A illustrates one example according to the present invention in which a filter 20 receives data output from a printer driver 12, filters the data, and then outputs the filtered data to a network card 18 via an operating system 14 and connection 16. Also shown is a bypass connection 13, which allows a user to print without using the filter 20. That is, if the user selects an object to be printed by an application 11, but does not select a use of the filter 20, the printer driver 12 sends signals directly to the printer port or network card 18 via the bypass connection 13.

Figure 3B:
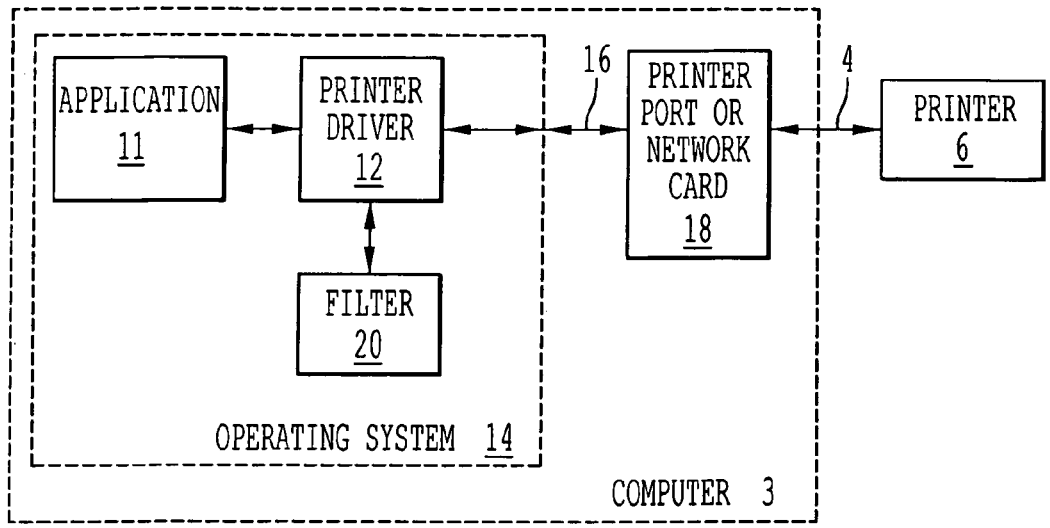
FIG. 3B is another block diagram illustrating functional components and data passed between a software application and a printer according to the present invention.

FIG. 3B is another example of the filter 20, in which the filter 20 receives data output from the printer driver 12, filters the data, and then outputs the filtered data stream back to the printer driver 12. The printer driver 12 then transmits the filter data to the network card 18 via the operating system 14 and connection. This example eliminates the need for the bypass connection 13 shown in FIG. 3A.

The filter 20 is an executable program which may be loaded onto a computer 3 via a computer storage medium, such as a CD-ROM, tape, disk or memory chip/card, an Internet server, or other remote computer or storage device, or may reside on a server controlling a plurality of computers networked to the printer. The filter 20 and the operation of selecting the same will now be explained in more detail.

Figure 4A:
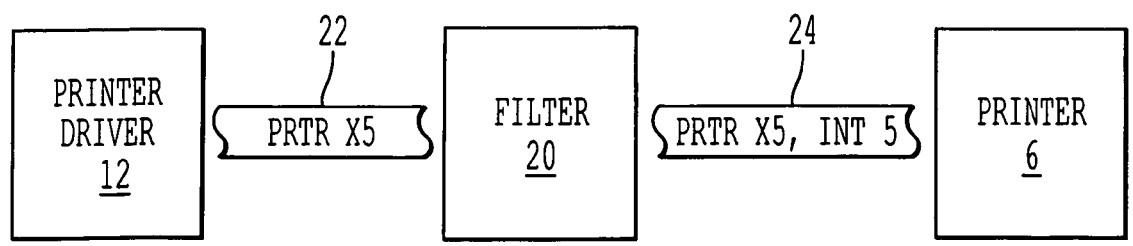
FIG. 4A illustrates a filtered printer data stream according to the present invention.

FIG. 4A illustrates a printer data stream 22 output from the printer driver 12, and a filtered data stream 24, which has been filtered by the filter 20. FIG. 4 shows, for purposes of illustration only, a description of a filter 20 which interleaves paper between consecutive transparencies. Thus, the transparencies do not stick together and can be easily separated because they are interleaved with paper. Further, if the item to be printed is printed on both the transparency and the interleaved paper, the user may display the transparency to an audience via an overhead display during a presentation and simultaneously view the item to be printed on the interleaved printed paper.

As shown, the printer data stream 22 includes the commands "PRTR X5," which is a printer instruction to print five transparencies. The printer instruction "PRTR X5" is used for illustration purposes only. That is, actual Postscript instructions to print five transparencies is significantly more detailed and has been omitted for simplicity. Note, Postscript is a printer description language (PDL) used to communicate with printers. Other PDLs may be used, such as PCL6 developed by Hewlett Packard.

The filter 20 receives and filters the printer data stream 22 according to the executable filter program. That is, as shown in FIG. 4A, the filtered data stream 24 includes the printer data stream 22 interleaved with printer commands "INT 5." The printer commands "INT 5" is a printer instruction instructing the printer to print interleaved pages between the transparencies. Again, the printer instruction "INT 5" is used merely as an example. In this case, a document or other item to be printed is printed only on the transparencies. The filtered data stream 24 is then sent to the printer 6, and the printer 6 prints, for example, five transparencies with paper interleaved therebetween. The filter 20 may also filter the printer data stream 22 so as to instruct the printer to print the document or other item on both the transparencies and the interleaved paper. In other words, the user may choose to interleave the transparencies with a blank page paper or a copied page paper.

Figure 4B:
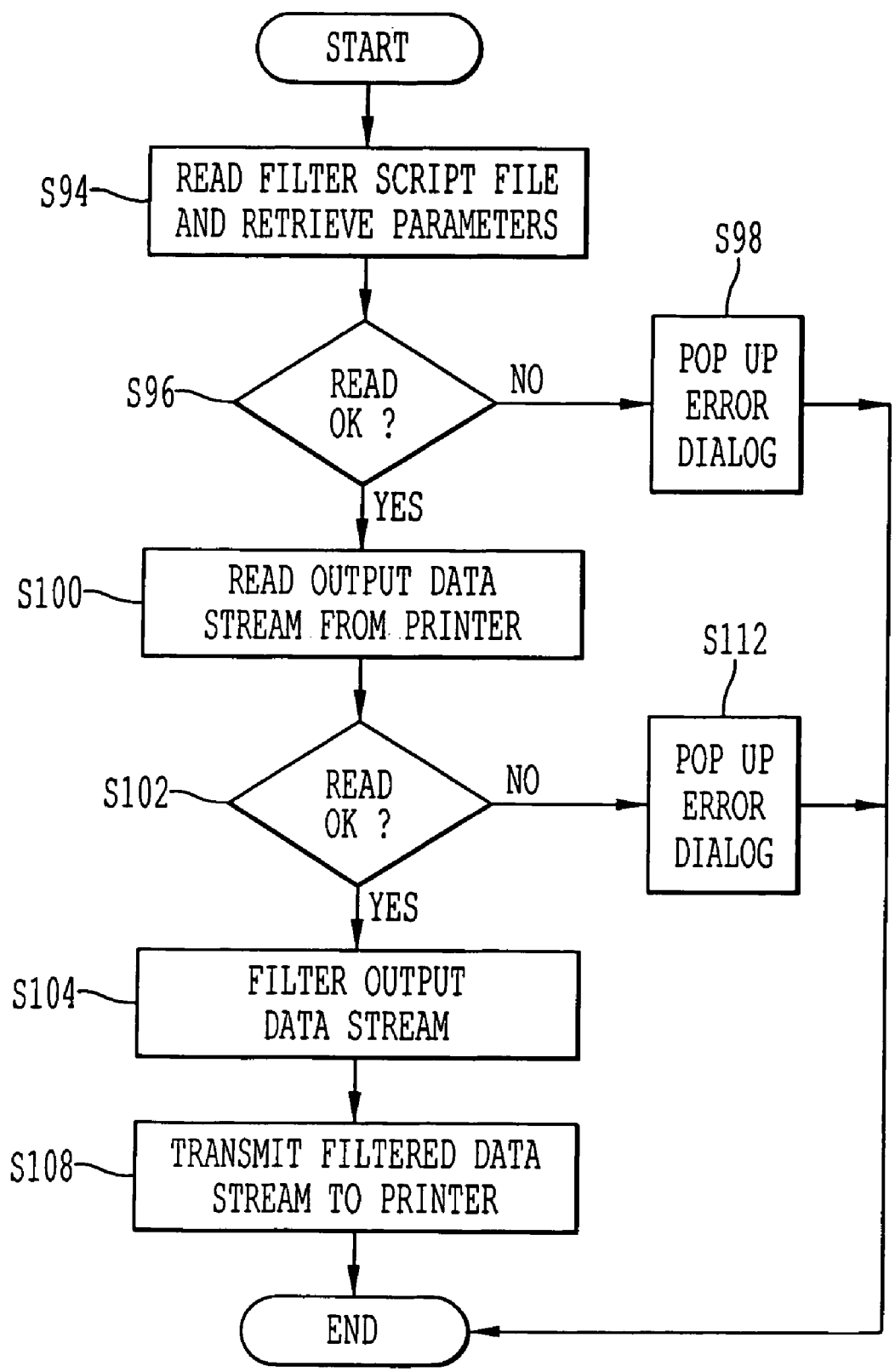
FIG. 4B is flowchart illustrating the steps performed by a computer program product according to the present invention.

FIG. 4B is a flowchart illustrating the steps performed by a filter. In particular, the selected filter 20 reads a corresponding script file and retrieves any necessary parameters or information (Step S94). The corresponding script file is discussed in more detail later. If the corresponding script file is not successfully read (No in Step S96), an error dialog is popped up on the display of the computer 3 notifying the user of this error (Step S98). If the read operation was successful (Yes in Step S96), the selected filter 20 reads and saves a printer data stream output from the printer driver 12 (Step S100). If the printer output data is successfully read without any errors (Yes in Step S102), the filter 20 filters the received output data stream (Step S104) according to the corresponding executable filter program (i.e., the filter). If the data is not successfully read (No in Step S102), an error dialog is popped up on a display of the computer 3 notifying the user of this error (Step S112) and the operation ends. After the data is filtered by the filter 20, the filtered output data stream is transmitted to the printer 6 via the operating system 14, connection 16, network card 18, and network 4 (Step S108).

It is possible to determine whether or not data was successfully read by using, for example, standard input/output functions provided with a computer programming language. For example, the C/C++ programming language includes a standard "fread( )" function which may be used to read the printer data stream. If an error occurs during the "fread( )" function, an error value of zero, for example, is returned. Thus, using this returned value, it is possible to determine whether or not the data is successfully read.

In addition, the filter 20 filters the printer data stream based on instructions corresponding to a user-specified print operation. For example, to print documents similar to that shown in FIG. 8F, the user may select a filter 20 called sandwich.exe. The filter 20 then scans the saved printer data stream for collate and duplex commands (e.g., Postscript commands). The filter 20 also retrieves the total page numbers to be printed and determines if the total number of pages is sufficient to perform the sandwich.exe filter products shown in FIG. 8F. That is, if the total page number is less than three, for example, it may not be possible to sandwich three pages between a cover page and a back page (i.e., this would require a total of at least five pages). Other error processing and validation checks may be readily achieved by appropriate computer instructions. After the filter 20 performs the appropriate error processing/validation checks, the filter 20 filters the printer data stream. For example, to achieve the documents shown in FIG. 8F for a non-duplex copy mode, the filter 20 inserts the tray number one (e.g., a Postscript command corresponding to tray #1) immediately after the page number one in the saved printer data stream. In addition, the filter 20 inserts tray number two (e.g., a Postscript command corresponding to tray #2) after the second page number in the saved printer data stream. Finally, the filter 20 inserts tray number three (e.g., a Postscript command corresponding to tray #3) after the fourth page number in the saved printer data stream. Then, the filtered printer data stream is transmitted to the printer and the first page number is printed from tray #1, the second and third page numbers are printed from tray #2, and the fourth page is printed from tray #3.

Further, the error dialogs discussed above (i.e., in Steps S98 and S112) display information about the particular error which occurred. For example, if the data stream from the printer driver 12 is not successfully read, an error dialog may contain text that enables a user to troubleshoot the error. In addition, a user may select a "Preview Result" push button 52 shown in FIG. 7A to determine if an output data stream was properly filtered and transmitted to the printer. This is described in more detail later.

Figure 5:
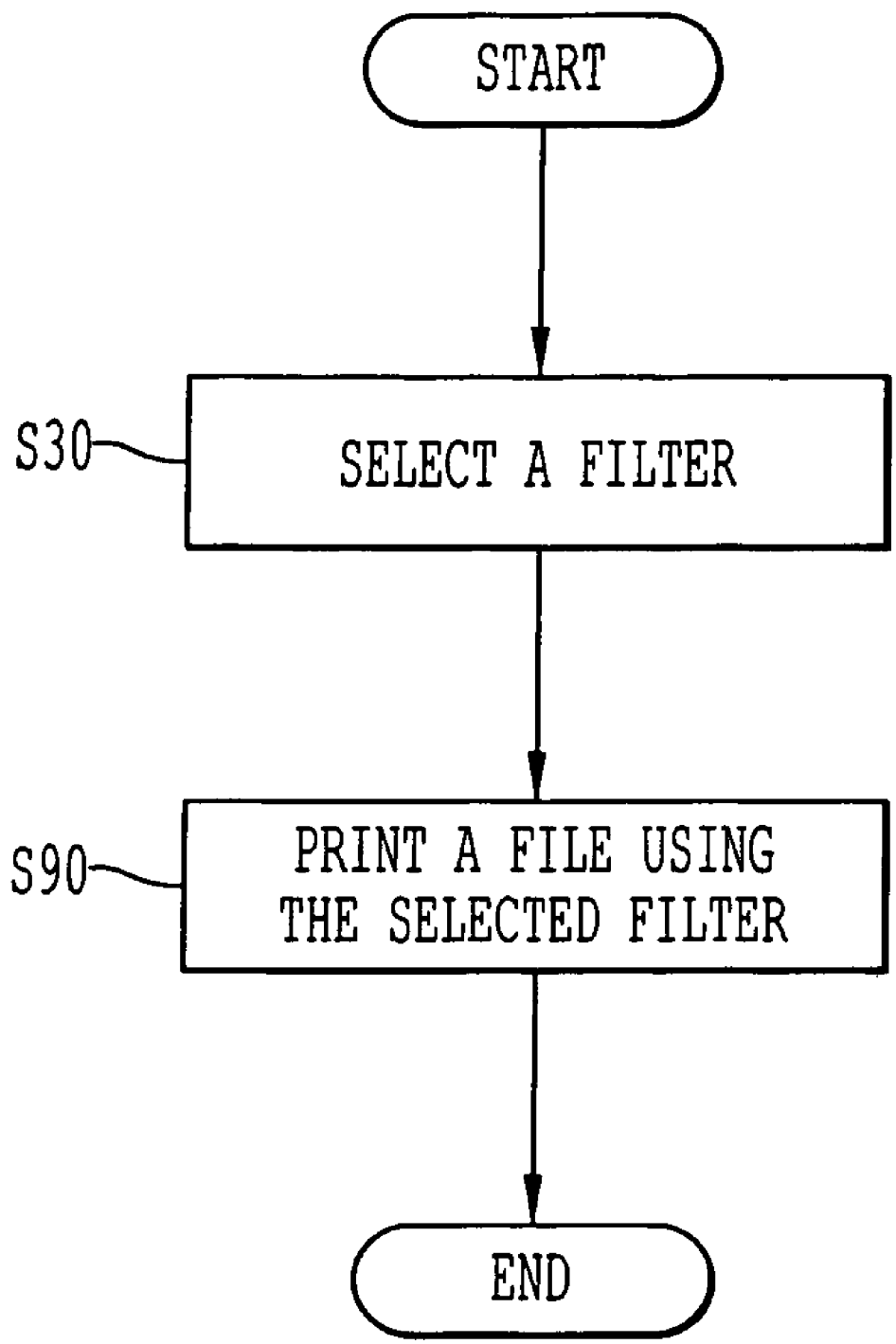
FIG. 5 is a flowchart illustrating a general overview of the steps of printing a file according to the present invention.

FIG. 5 is a flowchart illustrating a general overview on how to print a file according to the present invention. First, a user selects a filter (Step S30) and then prints the file Step S90). The selection of a filter will now be described in more detail with reference to FIGS. 6 and 7A-7E.

Figure 6:
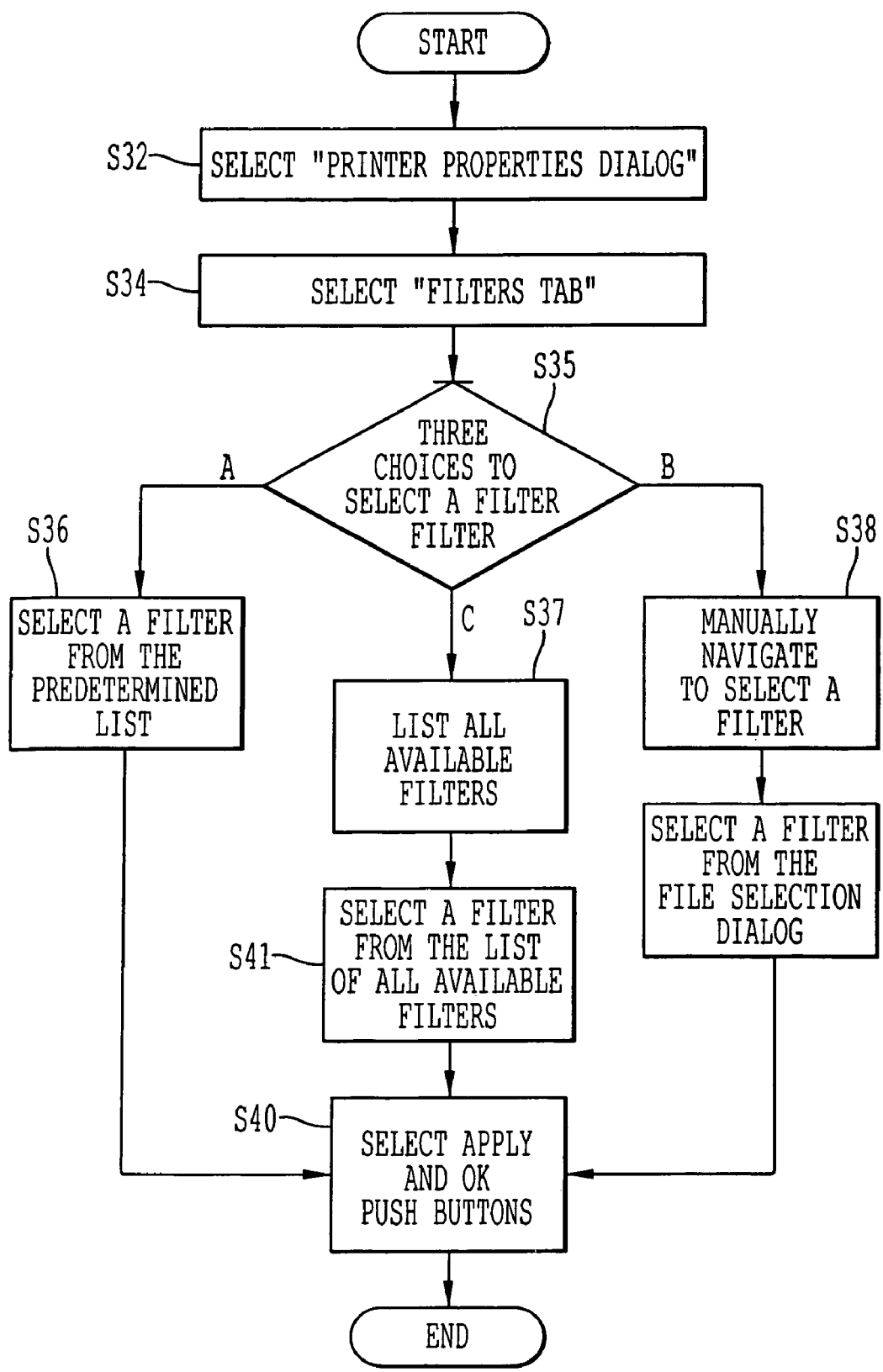
FIG. 6 is a flowchart illustrating the steps of selecting a filter according to the present invention.
Figure 7A:
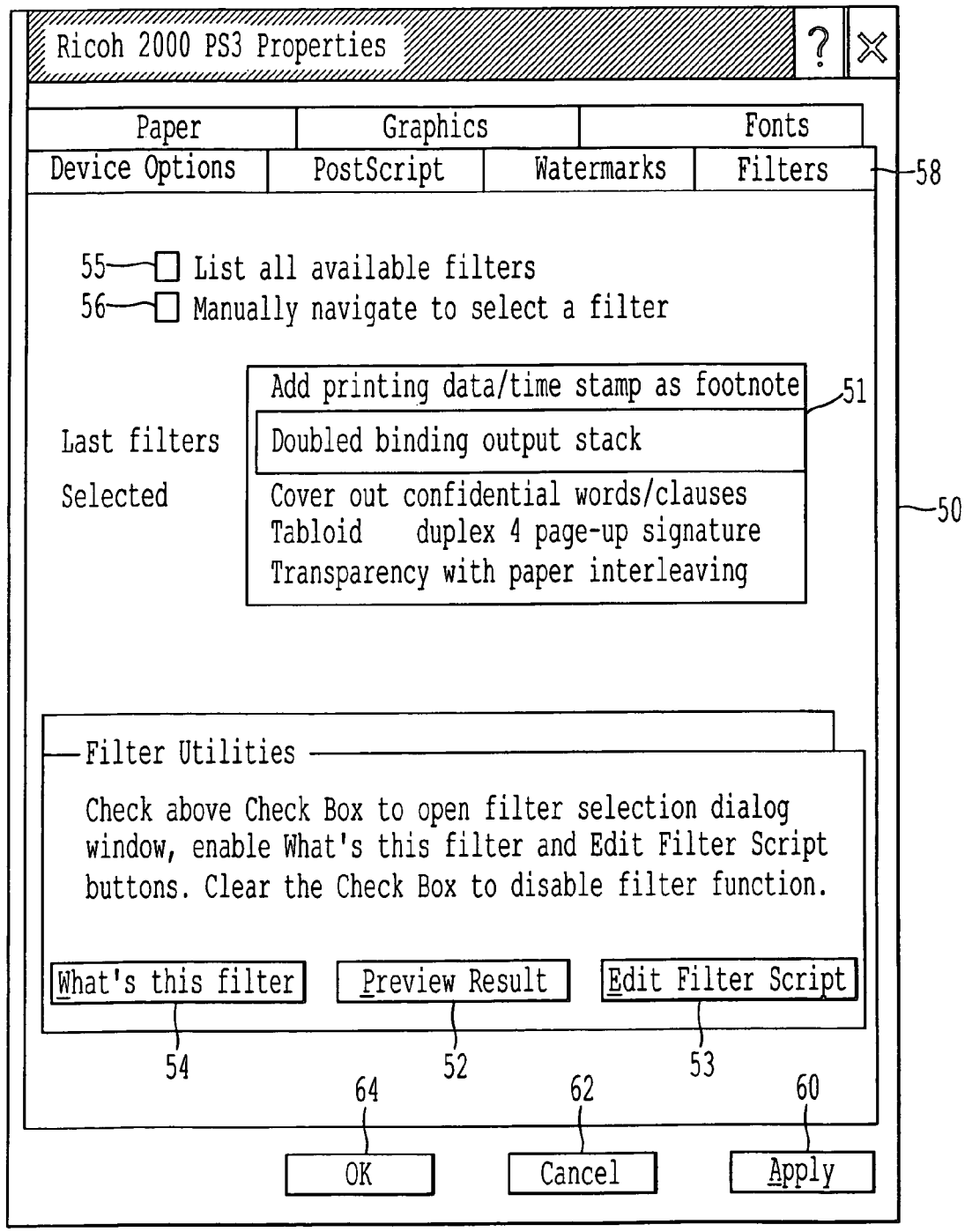
FIG. 7A is a printer properties dialog according to the present invention.

First, a user selects a printer properties dialog 50 shown in FIG. 7A (Step S32 in FIG. 6). Selection of a printer properties is accomplished by, for example, selecting the "Start"; "Settings"; "Printers" display regions on a main menu bar in the Windows 95 operating environment, and then selecting "Properties" dialog for a desired printer (e.g., by clicking the right mouse on the desired printer). One example of a difference between the printer properties dialog 50 and a conventional printer properties dialog is a filter tab 58. The properties dialog 50 may also pop up on computer's display when the user opts to print a file. Then, the user selects the filters tab 58 (Step S34 in FIG. 6) from the printer properties dialog 50.

After the user selects the filters tab 58, there are three available choices (paths A, B and C in Step S35). The first choice (path A) is to select a filter from a first filter selection box 51 (Step S36), which identifies a list of predetermined filters, such as a list of the last filters selected or a list of default filters. If the user wants to use one of the filters identified in the first filter selection box 51, the user need only highlight (i.e., select) the desired filter via a mouse or other pointing device.

The user may then select the Apply push button 60 and/or OK push button 64 (Step S40). The Apply push button 60, Cancel push button 62 and OK push button 64 are default push buttons supplied with a window programming package, such as a window program package sold under the trademark VISUAL BASIC, or other window system.

If, however, the user wishes to select a filter not shown in the first filter selection box 51, the user may select a second filter selection box 56 (Step S38). The second filter selection box 56 allows the user to manually navigate through the directories on the computer to select a desired filter. When the user selects the second filter selection box 56, a filter selection dialog 70, shown in FIG. 7B, pops up on the display of the computer 3. The user may then select a filter from one of the corresponding filters listed in a filters window 72 (Step S39). The user may also select a third filter selection box 55 (Step S37). This selection pops up a filter selection dialog 80 shown in FIG. 7C, which lists all of the available filters. The user need only then select a desired filter from the list of available filters (Step S41). The user may then select the A; ply push button 60 and/or OK push button 64 (Step S40) shown in FIGS. 7A, 7B and 7(to enable the respective filter.

In addition, referring to FIG. 7A, when the first, second or third filter selection boxes 51, 55 and 56 are selected, a "What's this filter" push button 54 and "Edit Filter Script" push button 53 are visible, indicating that these push buttons are capable of being selected (note the push buttons 54 and 53 are not highlighted and the filter selection boxes 51 and 56 are also not selected in FIG. 7A). If the "What's This Filter" push button 54 is selected, a help dialog pops up on the display and provides a user with general information about the selected filter, which is described in more detail with reference to the flow chart of FIG. 10. If the "Edit Filter Script" push button 53 is selected, the user is able to modify a filter script file associated with the selected filter, which is described in more detail with reference to the flow chart of FIG. 11. The "Preview Result" push button 52 is visible after a user has selected a filter and printed a document or other item using the filter, and allows the user to preview the result of the filtered printer command transmitted to the printer. Thus, the user is able to troubleshoot or debug a particular print operation. A more detailed description of the "Preview Result" push button 52 is described later with reference to the flow chart of FIG. 9. Further, the "Whats This Filter" push button 54, "Preview Result" push button 52 and "Edit Filter Script" push button 53 are illustrated only in FIG. 7A, but may also be included in the dialogs 70, 80 shown in FIGS. 7B and 7C.

Figure 7B:
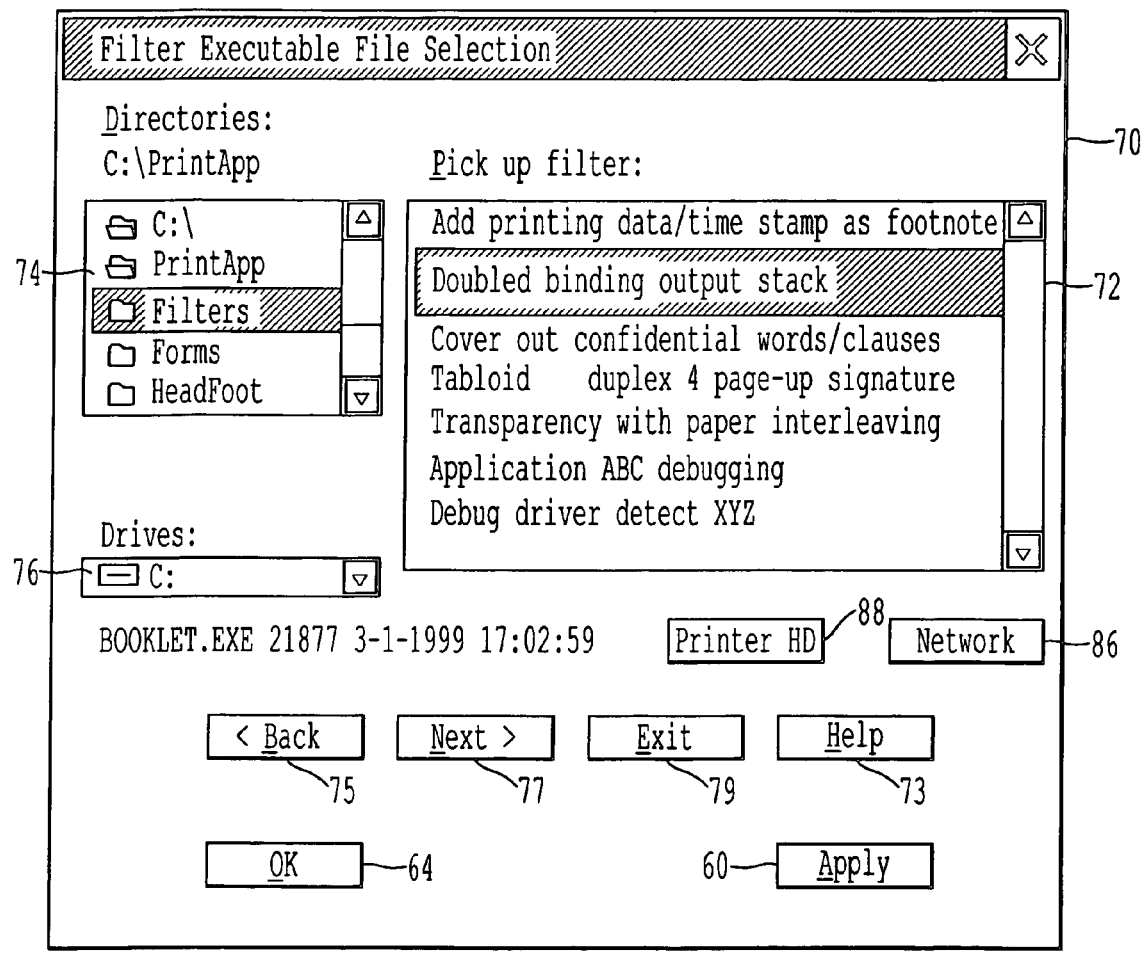
FIG. 7B is a filter executable file selection dialog according to the present invention.

Turning now to the filter selection dialog 70 shown in FIG. 7B. To select a filter from this dialog, the user may select an appropriate folder from a directory window 74 and a disk drive window 76, thereby accessing all of the available filters in that particular directory on the computer 3. The available filters shown in the filters window 72 include: 1) "Add printing date/time stamp as footnote" which may correspond to an executable named date-time.exe, 2) "Booklet binding output stack" which may correspond to an executable named booklet.exe, 3) "Cover out confidential words/clauses" which may correspond to executable named confidential.exe, 4) "Tabloid size duplex 4 page-up signature" which may correspond to an executable named tabloid.exe, 5) "Transparency with paper interleaving" which may correspond to an executable named interleave.exe, 6) Application ABC debugging" which may correspond to an executable named debug-app.exe, and 7) "Debug driver detect XYZ" which may correspond to an executable named debug-driver.exe. The debug-app.exe filter is, for example, a patch to fix a specific application, and the debug-driver.exe filter is a patch to fix a specific printer driver debug. The debug-app.exe and debug-driver.exe filters may be developed by an end-user, or be provided by the application's vendor. The purpose of the debug applications are to troubleshoot problems when an application or driver sends commands to the printer which are inaccurate or need debugging. However, the present invention is not limited to these filters. That is, other filters may be included in this directory, and thus be available for the user to select. Also shown is a help push button 73 that may be selected to view help information about the particular filter highlighted in the filters window 72 (i.e., a help dialog pops up on the display providing help text about the selected filter). A Back push button 75 and a Next push button 77 respectively allow the user to toggle back to the parent dialog (i.e., the printer properties dialog 50 shown in FIG. 7A) or to a child dialog (not shown). Further, an Exit toggle button 79 allows the user to exit the filter executable file selection dialog 70.

In addition, the filters shown in the filter window 72 are those resident in the specified directory of the computer. However, the filters may be resident on a server controlling a plurality of computers networked to the printer or be resident on the actual printer, for example. If the desired filter resides on the server, for example, the user may select a Network push button 86, at which time a filter executable file selection window (not shown, but similar to the one shown in FIG. 7B) will pop up on the display. Thus, using this selection window, the user may select a particular filter resident on the server. Similarly, a user may select a Printer push button 88 to select a particular filter resident on the printer's hard disk (not shown). Also shown are an OK push button 64 and Apply push button 60. These push buttons operate in a same fashion as that described for FIG. 7A.

Figure 7C:
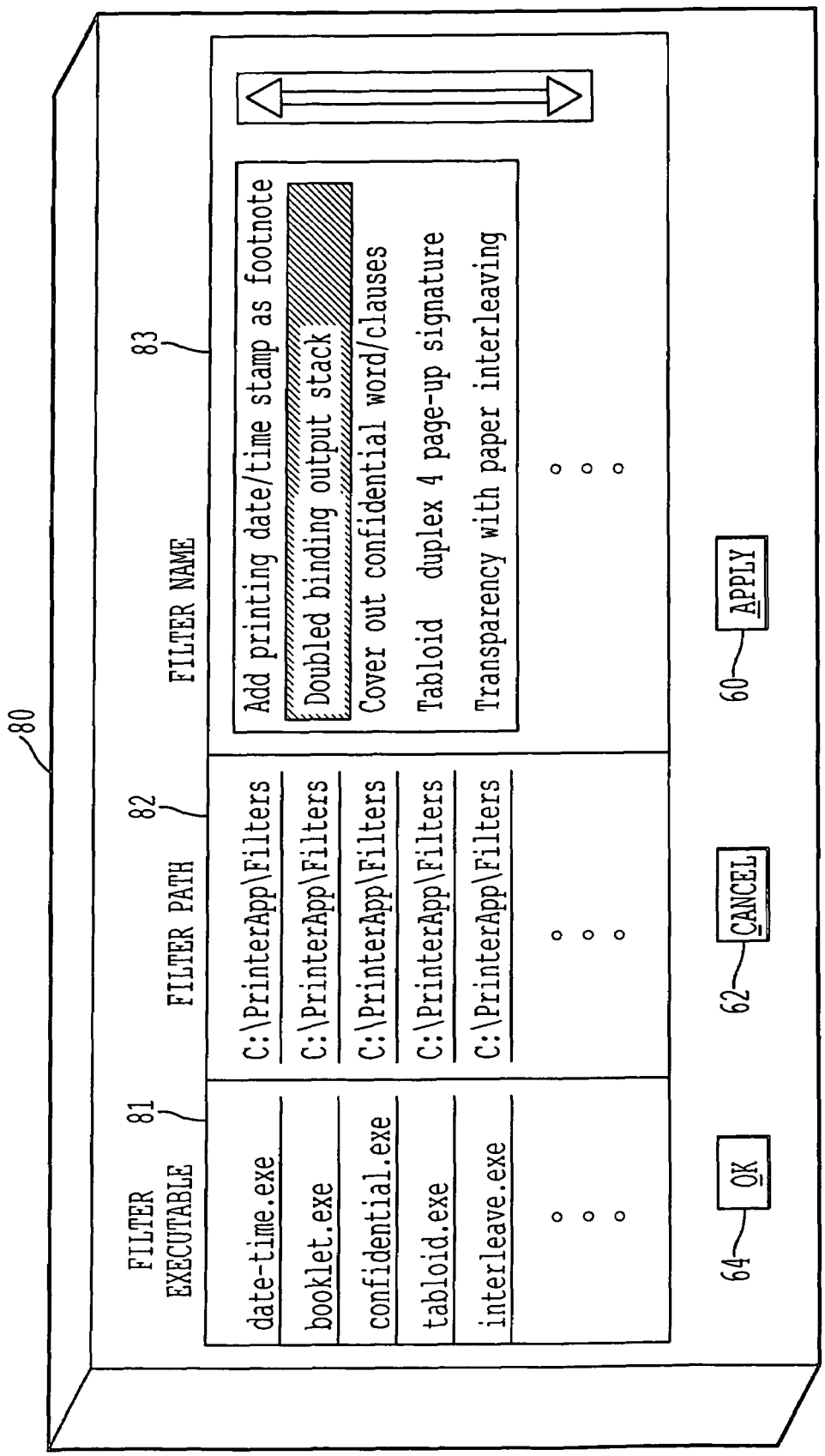
FIG. 7C is another filter executable file selection dialog according to the present invention.

FIG. 7C illustrates the filter selection dialog 80, which pops up on the display when the user selects the third filter selection box 55 shown in FIG. 7A. The filter selection dialog 80 includes a "filter executable" display region 81, a "path name" display region 82 and a "filter name" display region respectively corresponding to the name of the filter executable file, directory path name of the filter executable, and a user-friendly name of the filter executable file. The dialog 80 displays all of the available filters resident on the computer, but may also be configured to display the files resident on the printer and/or server controlling the printer. In the example shown in FIG. 7C, all the available filters reside in the directory "C:Print\App\Filters." However, a computer program may be used which searches other directories for filters and these filters may also be displayed in the dialog 80. The OK push button 64, Cancel push button 62 and Apply push button 60 are the same as that discussed previously. That is, to select a filter displayed in the dialog 80, the user need only highlight a filter and select the Apply push button 60 and OK push button 64.

In addition, in some instances, a parameters window 90, 91 (see FIGS. 7D and 7E) pops up on the display after the user selects a filter, if the particular filter requires additional parameters. For example, the parameters window 90 in FIG. 7D corresponds to the interleave-transparencies filter, and prompts the user for additional parameters, such as a tray to use for the interleaved papers and a tray to use for the transparencies. This information may be input by a "select transparency tray" box 92 and a "select separation paper tray" box 94. The Cancel push button 98 and OK push button 96 are similar to those discussed above. An additional input region (not shown) may be provided to the parameters window 90, which allows the user to print a document on both the transparency and the interleaved paper. Therefore, during a presentation, for example, the user may display the transparency to an audience via an overhead display and simultaneously view the document on the interleaved printed paper.

Figure 7D:
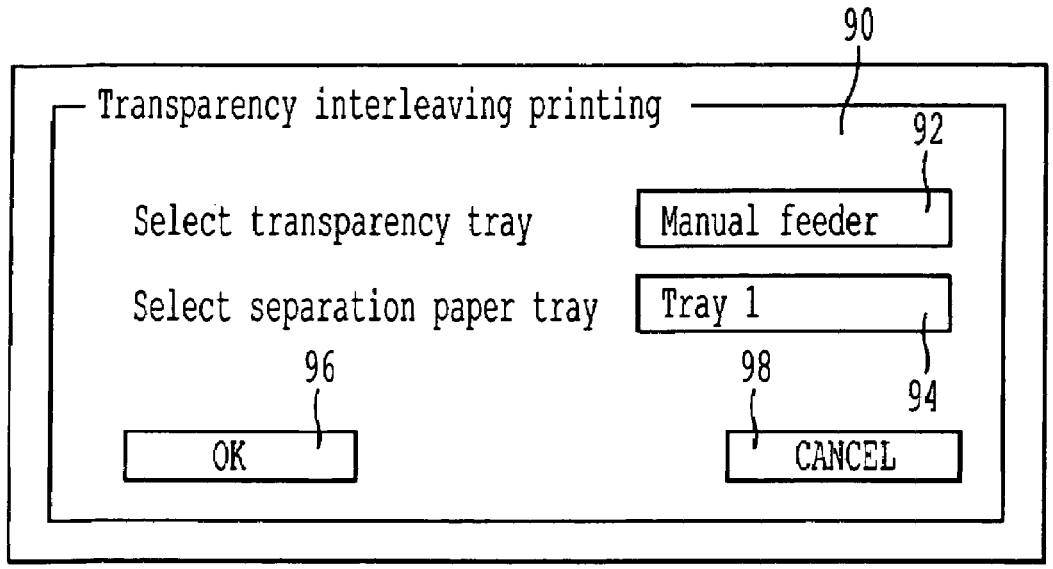
FIG. 7D is a parameters dialog for a transparency-interleave computer program product according to the present invention.
Figure 7E:
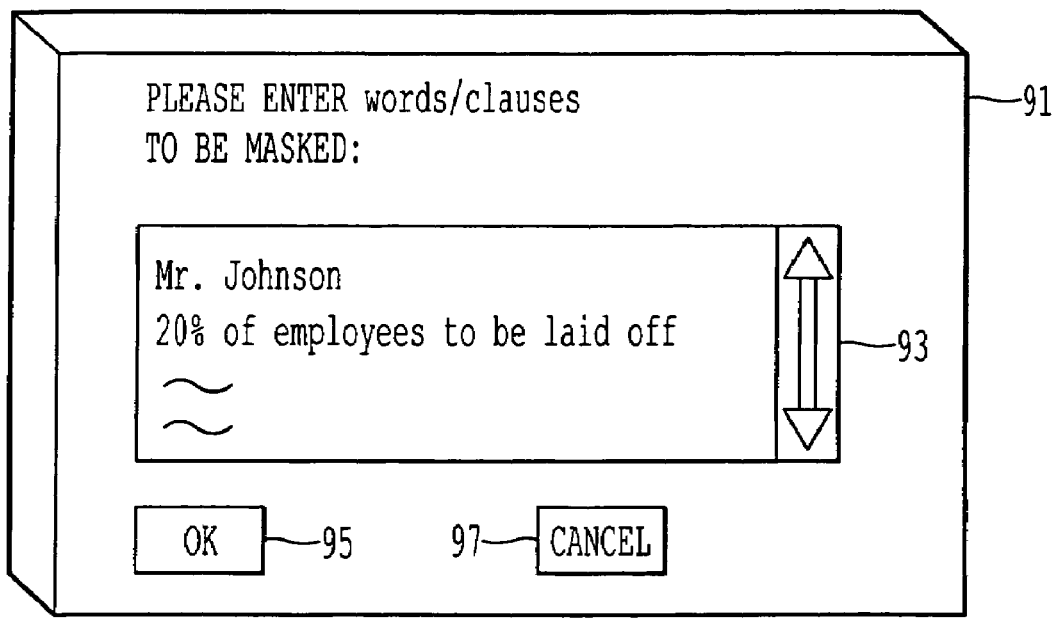
FIG. 7E is a parameters dialog for a computer program product according to the present invention which masks words/clauses on a printed document.

As another example, the parameters window 91 shown in FIG. 7E corresponds to the confidential.exe filter, and prompts the user for additional parameters, such as words and/or clauses to be masked on a printed document. This information may be input using an input text box 93. The Cancel push button 97 and OK push button 95 are similar to those discussed above. In this example, the user may print a document with the words listed in the text box 93 masked, thus preventing an unauthorized user from reading the confidential words and/or clauses.

The dialogs shown in FIGS. 7A, 7B, 7C, 7D and 7E allow the user to select a particular filter, and including radio buttons, push buttons, radio boxes, toggle buttons, etc., which are known manners of inputting using a graphic user interface package (e.g., VISUAL BASIC, X-windows, etc.). However, other suitable layouts may be used so that the user can conveniently select a particular desired filter and input any required parameters. As discussed above, the OK push button 64, Cancel push button 62, and Apply push button 60 are generally known. The "What's this filter" push button 54, "Preview Result" push button 52, and "Edit Filter Script" push button.53 are described later in more detail with reference to FIGS. 9, 10 and 11. In addition, the first, second and third filter selection boxes 51, 56 and 55 are configured to deactivate after a desired filter has been selected. Thus, each time a user wants to print a document with a filter, a desired filter must be selected. Alternatively, a predetermined filter may be configured to always be activated, for example, by storing in a memory the last filter selected. This may be useful for a user who successively prints with a particular filter.

Figure 8A:
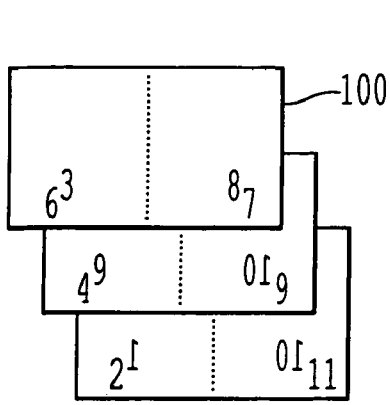
FIGS. 8A-8F are examples of output documents produced by computer program products according to the present invention.
Figure 8B:
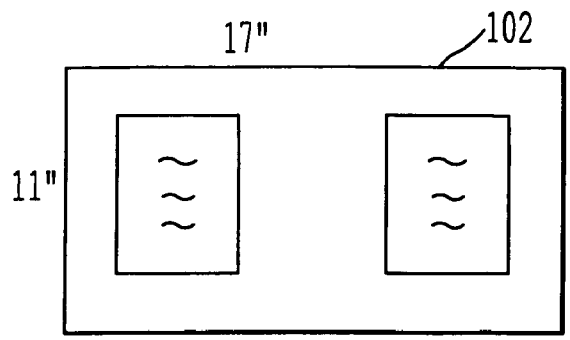
Figure 8C:
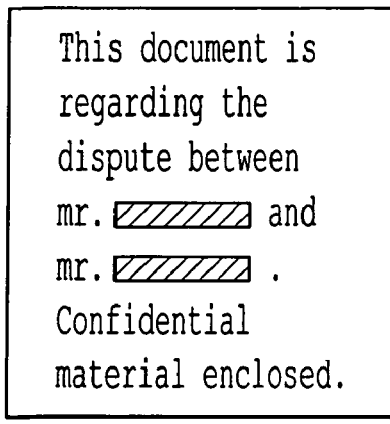
Figure 8D:
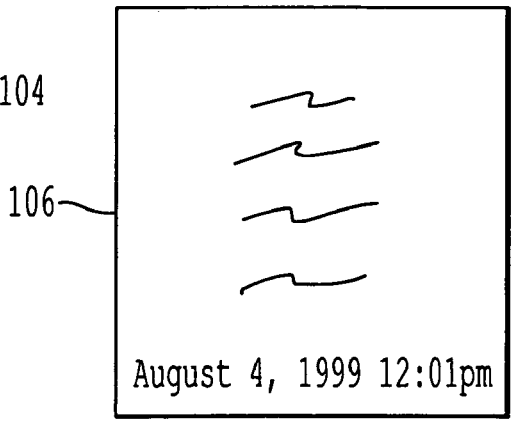
Figure 8E:
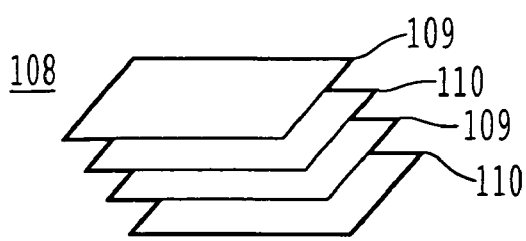
Figure 8F:
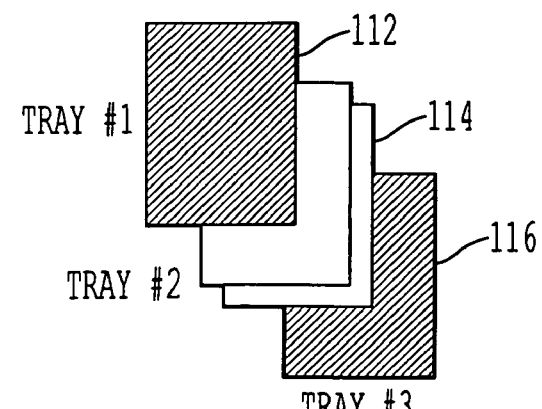

FIGS. 8A-8F are examples of printed documents corresponding to particular filters according to the present invention. In particular, FIG. 8A illustrates printed book pages 100 which include four page-numbers on each sheet of paper. Thus, a user may select a filter called booklet.exe, for example, and print documents as shown in FIG. 8A. The documents may then be bound into a book. FIG. 8B illustrates a tabloid paper 102 (i.e., 11"×17", for example), on which two documents are printed on a single side of the paper 102. Thus, a user may select a filter called tabloid.exe, for example, and print documents as shown in FIG. 8B. Further, FIG. 8B illustrates documents printed only on one side of a page, but both sides may also be printed on (i.e., duplex copying). More than two documents may also be printed on either one side or both sides of a page. FIG. 8C illustrates a printed document 104, which includes confidential words (e.g., a person's name) that are masked. Thus, a user may select a filter called confidential.exe, for example, and print documents as shown in FIG. 8C. The confidential words to be masked may be included in an accessory file, which is read by the confidential.exe executable filter. The accessory file is a text file including a list of confidential words to be masked. Alternatively, the confidential words to be masked may be included in a companion script file, as discussed below. Further, the words to be masked may be input in the parameter window 91 as shown in FIG. 7D and as discussed above. FIG. 8D illustrates a document 106 with the date and time printed as a footnote. Thus, a user may select a filter called date-time.exe, for example, and print documents as shown in FIG. 8D. FIG. 8E illustrates documents 108, which include transparencies 109 interleaved with white paper 110. These output documents 108 correspond to a selected filter called interleave-transparencies.exe, for example. FIG. 8F illustrates documents 112 printed from a paper tray 1, documents 114 printed from a paper tray 2, and a back page 116 printed from a paper tray 3. In this example, the document 112 may be a cover page, documents 114 may be a body of a report and the document 116 may be a back page. Further, the document 112 may be a different color then that of the documents 114 interleaved between the page 112 and back page 116. The particular trays to be printed from may be input into a parameters window, or be included in an accessory file or script file. These output documents 112, 114, 116 correspond to a selected filter called sandwich.exe for example.

As discussed above, the filter 20 is an executable program. The executable program may be developed using any suitable programming language, such as C, C++, FORTRAN, etc. The naming convention will depend on the type of operating system. For example, a filter executable file on an operating system, such as that used by Windows 95, may have a file name called booklet.exe. In addition, according to the present invention, the executable filter file may also include a companion script file, as discussed above which has a similar base file name as the executable file, but has a different extension name, such as booklet.ftr. Likewise, the accessory file discussed above may have a filename "mask-words.ftr." If the additional parameters (e.g., confidential words to be masked) are included within the companion script file, an accessory file may not be required. The companion script file is a plain text file, which is read by the corresponding filter when the user selects the "What's this filter" push button 54, "Preview Result" push button 52 or "Edit Filter Script" push button 53 in FIG. 7A. The companion script file may also be read by the corresponding filter when the user selects a filter which requires additional parameters, such as confidential words to be masked. One typical example of a companion script file will now be explained with reference to Table 1 below.

TABLE 1

Filter script file format

| Line # | Contents | Purposes |
|---|---|---|
| 1 | Filter title | Filter identification |
| 2 | Filter Script File Editor with full path name | Execute Editor to edit Filter Script file |
| 3 | Preview application name with full path name | Execute preview application to preview the filtered data. |
| 4 - End Help Delimeter (e.g., #) | Help text | Customized Help facility |
| 5. End Help Delimeter (e.g. #) to EOF | Additional parameters | Additional parameters for filter, (e.g., confidential words) |

The first line number 1 in the filter script file is the title of the filter and is preferably limited to a predetermined length, such as forty characters long. The second line number 2 identifies a filter script file editor, which is any editor that can edit a text file, including its full path name. The filter script file editor may be a Microsoft WordPerfect application for example, and is executed when the user selects the "Edit Filter Script" push button 53 in FIG. 7A. The third line number 3 identifies a preview application, including its full path name, which is activated when the user selects the "Preview Result" push button 52 in FIG. 7A. In addition, the fourth line number 4 to an end of help delimiter (e.g., #) is help text which is displayed when the user selects the "What's this filter" push button 54 in FIG. 7A. The line number from the end of help decimeter # to the end of file (EOF) contain additional parameters, such as confidential words to be masked, and may be read by the corresponding filter when the filter is selected. Alternatively, as discussed above, the additional parameters may be either included in a separate accessory file, or may be input by displaying a parameters windows 96 or 91 shown in FIGS. 7D and 7E, for example. If it is assumed the help text is N lines long (where N=0, 1, 2 . . . ) the additional parameters would begin at line number N+5. Further, a value of N=0 means the end help delimeter it would be in line 4 of the script file.

Figure 9:
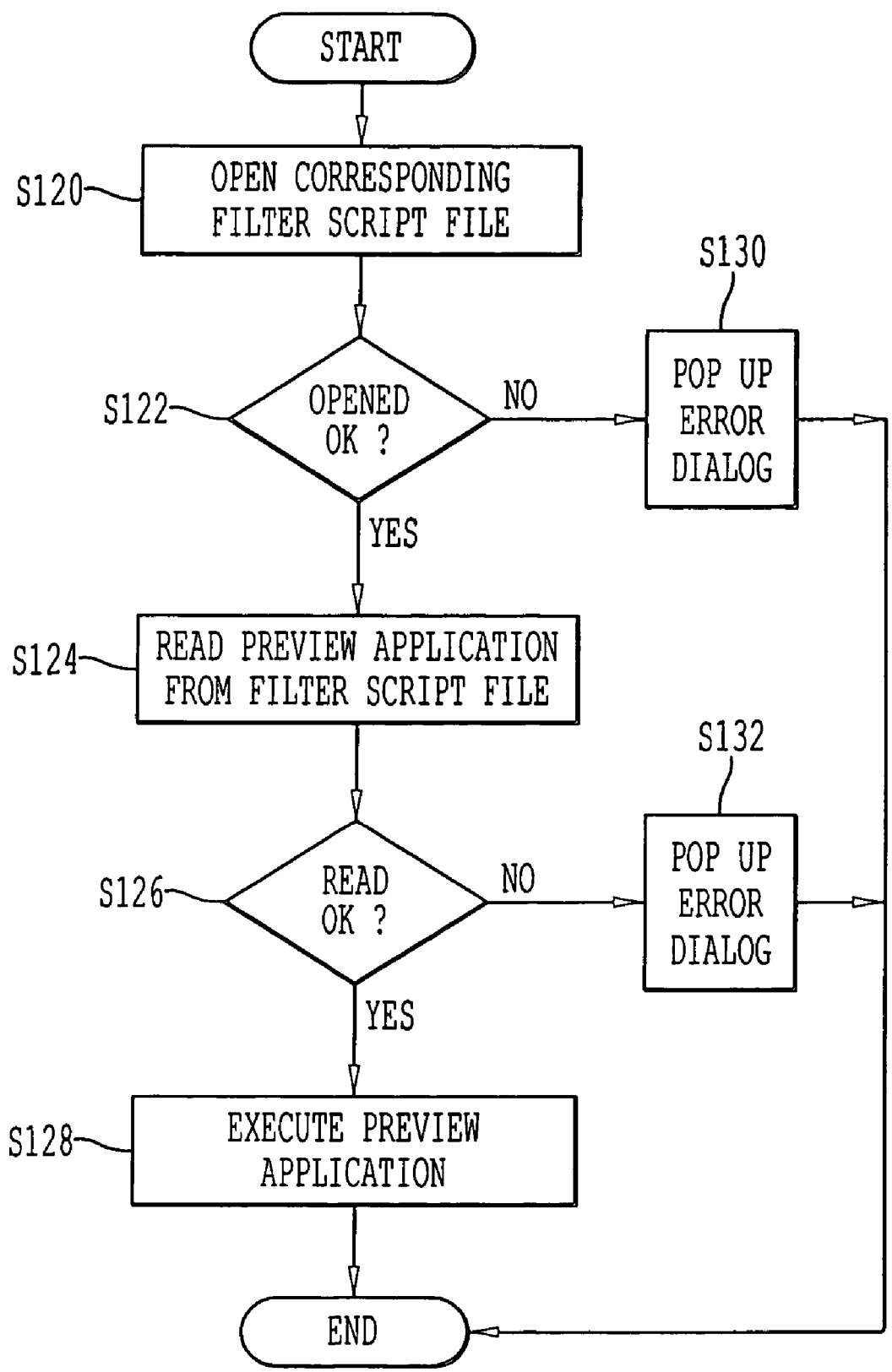
FIG. 9 is a flowchart illustrating the steps performed after a user selects the "Preview Result" push button shown in FIG. 7A.
Figure 10:
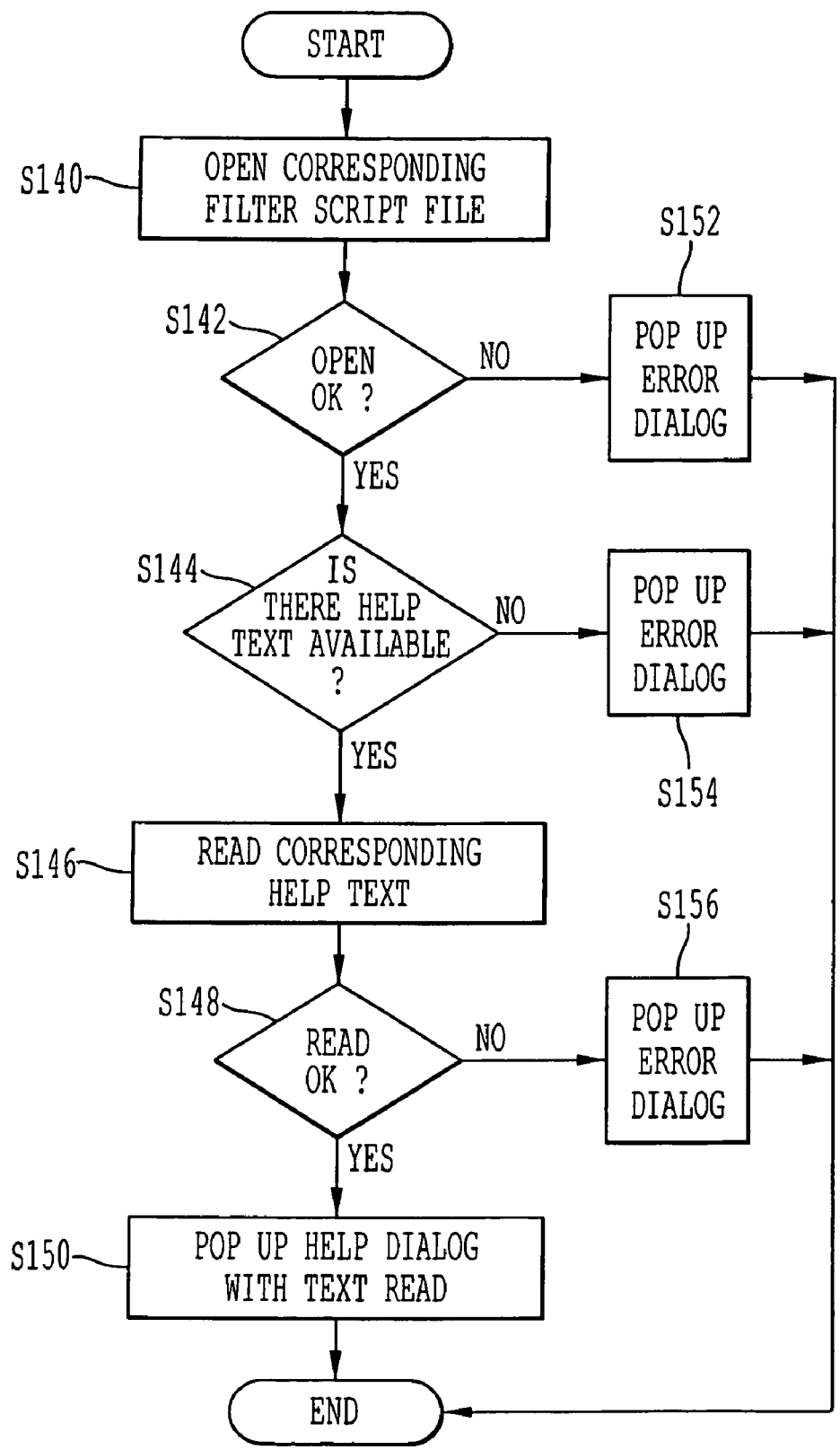
FIG. 10 is a flowchart illustrating the steps performed after a user selects the "What's this filter" push button shown in FIG. 7A.

FIGS. 9 and 10 respectively illustrate a process which occurs when the "Preview Result" push button 52 and "What's this filter" push button 54 are selected in FIG. 7A. When the "Preview Result" push button 52 is selected, the corresponding filter script file is opened (Step S120 in FIG. 9). It is determined in Step S122, whether the file was successfully opened. If the file was not opened successfully (No in Step 122), an error dialog is popped up on the display explaining this error to the user (Step S130). The determination as to whether or not the file was successfully opened may be accomplished by using the standard input/output routines provided with a programming language (similar to that discussed for the fread( ) function. If the file was successfully opened (Yes in Step S122), the third line 3 of the script file is read which identifies a directory path name of a preview application (Step S124). It is then determined in Step S126 if the read operation was successful. If the read operation was not successful (No in Step S126), an error dialog is popped up explaining this error to the user (Step S132). If the read operation is successful (Yes in Step S126), the preview application identified in line number 3 is executed (Step S120). Preview applications are software applications which allow the user to view the filtered printer data stream sent to the printer. Thus, the user is able to debug or troubleshoot a particular print operation. The preview applications are generally integrated with the windows package, such as the one sold under the trademark POSTSCRIPT VIEWER integrated with Windows 95.

FIG. 10 is similar to FIG. 9, but illustrates an operation which occurs when the "What's this filter" push button 54 is selected in FIG. 7A. First, the corresponding filter script file is opened (Step S140), and it is determined in Step S142 if the open operation was successful. If the operation was not successful (No in Step S142), an error dialog is popped up explaining this error to the user (Step S152). If the open operation was successful (Yes in Step S142), it is determined whether there is help text data in line number 4 to an end of the help delimiter "#"(Step S144). If there is no help text data (No in Step 144), an error dialog is popped up explaining to the user that no help is available (Step S154). If there is help text available (Yes in Step S144), the help text is read (Step S146). Then it is determined in Step S148 if the read operation was successful. If the operation was not successful (No in Step S148), an error dialog is popped up explaining this to the user (Step S156). If the read operation is successful (Yes in Step S148), a help dialog is popped up displaying the help text read from the script file (Step S150). The user may then select a Cancel or OK push button on the help dialog and the operation ends. It may be determined if the corresponding script file was opened successfully, whether or not there is any help text available, and whether the read operation was successful by using standard input/output functions provided with a programming language.

Figure 11:
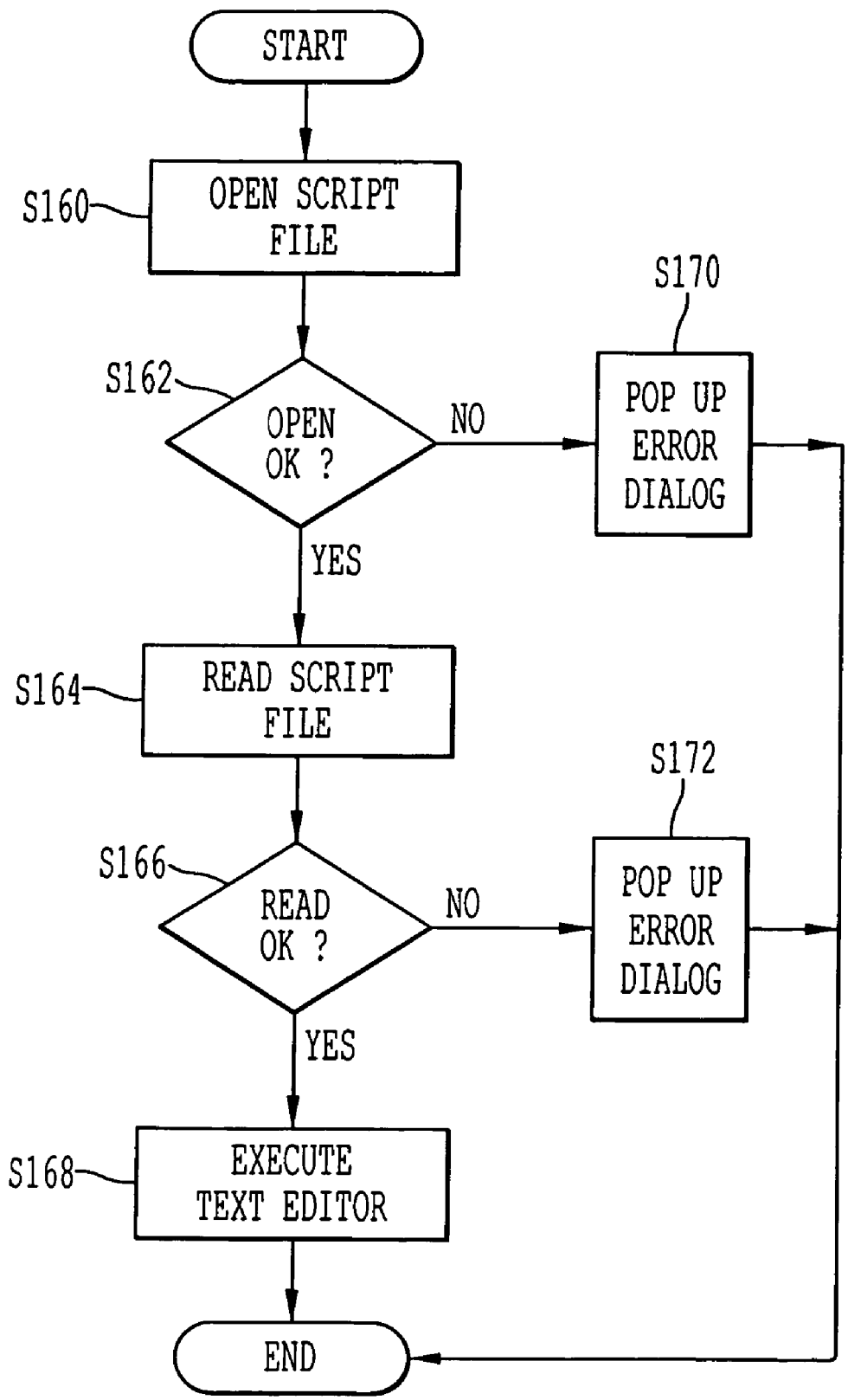
FIG. 11 is a flowchart illustrating the steps performed after a user selects the "Edit Filter Script" push button shown in FIG. 7A.

FIG. 11 illustrates a process which occurs when the added "Edit Filter Script" push button 53 is selected in FIG. 7A.

When the "Edit Filter Script" push button 53 is selected, the corresponding filter script file is opened (see Step S160). It is determined in Step S162, whether the file was successfully opened, by using the standard input/output routines provided with the programming language. If the file was not opened successfully (NO in Step S162), an error dialogue is popped up explaining this error to the user. (Step S170). If the file was successfully opened (YES in Step S162), the second line 2 of the script file is read which identifies the directly path name of a filter script file editor, such as a Microsoft WordPerfect application (Step S164). It is then determined in Step S166 if the read operation was successful. If the read operation was not successful (NO in Step S166), an error dialog is popped up explaining this error to the user (Step S172). If the read operation is successful (YES in Step S166), the filter script file editor identified in line number 2 is executed. (Step S120). Thus, by selecting the Edit Filter Script push button 53, thee user may change the parameters identified in the companion script file, for example. Again, it may be determined if the open and read operations were successful by using standard input/output functions provided with a programming language.

The computer program product (e.g., executable filter program, corresponding graphic user interface, companion script files, accessory files, etc. stored in a memory) according to the present invention may be sold separately or integrated with a word processing package, such as one sold under the trademark WORDPERFECT. Further, the filters according to the present invention may be sold independent of the printer driver or together with the printer software package including the printer driver. One important feature of the present invention is that the filters are separate software executable files from the printer driver software, which allows great flexibility for the user, as well as for the printer manufacturer.

This invention may be conveniently implemented using a conventional general purpose digital computer or microprocessor programmed according to the teachings of the present specification, as will be apparent to those skilled in the computer art. Appropriate software coding can readily be prepared by skilled programmers based on the teachings of the present disclosure, as will be apparent to those skilled in the software art. The invention may also be implemented by the preparation of application specific integrated circuits whereby interconnecting an appropriate network of conventional computer circuits, as will be readily apparent to those skilled in the art.

Any portion of the present invention implemented on a general purpose digital computer or microprocessor includes a computer program product which is a storage medium including instructions which can be used to program a computer to perform a process of the invention. The storage medium can include, but is not limited to, any type of disk including floppy disk, optical disk, CD-ROMs, and magneto-optical disks, ROMs, RAMs, EPROMs, EEPROMs, magnetic or optical cards, or any type of media suitable for storing electronic instructions.

Obviously, numerous modifications and variations of the present invention are possible in light of the above teachings. It is therefore to be understood that within the scope of the appended claims, the invention may be practiced otherwise than as specifically described herein.

The invention claimed is:

1. A graphical user interface comprising:
a first parent window including:
a first display control configured to display a child window listing a plurality of first filters having instructions corresponding to a print operation,
a second display control configured to display a list of second filters, and
a third display control configured to activate a help window including help text corresponding to a selected filter.

2. The graphical user interface according to claim 1, wherein the second display control displays a list of predetermined filters.

3. The graphical user interface according to claim 1, wherein the plurality of first filters is a list of available filters on a designated storage medium.

4. The graphical user interface according to claim 1, wherein the child window further includes:
a fourth display control configured to display a list of available filters on a computer hard drive.

5. The graphical user interface according to claim 1, wherein the child window further includes:
a fourth display control configured to display a list of available filters on a printer hard drive.

6. The graphical user interface according to claim 1, wherein the child window further includes:
a fourth display control configured to display a list of available filters on a server controlling a plurality of computers networked to a printer.

7. The graphical user interface according to claim 1, wherein the first parent window further includes:
a fourth display control configured to display a list of third filters.

8. The graphical user interface according to claim 7, wherein the list of third filters includes a list of all filters available to the user.

9. The graphical user interface according to claim 1, wherein the help text includes information about the selected filter.

10. A graphical user interface comprising:
a first parent window including:
a first display control configured to display a child window listing a plurality of first filters having instructions corresponding to a print operation,
a second display control configured to display a list of second filters, and
a third display control configured to activate a preview application.

11. The graphical user interface according to claim 10, wherein the preview application generates a preview of a result of a selected filter.

12. The graphical user interface according to claim 10, wherein the third display control is visible after a user has selected a filter and printed data using the filter.

13. A graphical user interface comprising:
a first parent window including:
a first display control configured to display a child window listing a plurality of first filters having instructions corresponding to a print operation,
a second display control configured to display a list of second filters, and
a third display control configured to activate a text editor.

14. The graphical user interface according to claim 13, wherein the text editor enables a user to modify a filter script file associated with a selected filter.

15. A graphical user interface comprising:
a first parent window including:
a first display control configured to display a child window listing a plurality of first filters having instructions corresponding to a print operation, and
a second display control configured to display a list of second filters that include a list of last filters selected.

16. A graphical user interface comprising:
a first parent window including:
a first display control configured to display a child window listing a plurality of first filters having instructions corresponding to a print operation, and
a second display control configured to display a list of second filters,
wherein another child window is displayed prompting a user for parameters corresponding to a selected filter when one of the first and second display controls are selected.

17. A graphical user interface comprising:
a first parent window including:
a first display control configured to display a child window listing a plurality of first filters having instructions corresponding to a print operation,
a second display control configured to display a list of second filters, and
a companion script file including parameters corresponding to a filter so as to provide filter flexibility.

18. The graphical user interface according to claim 17, wherein the companion script file includes at least one of the following parameters:
a) a title of the filter,
b) a name of a text editor to edit the companion script file,
c) a name of a preview application to preview a result of an executed filter,
d) help text, and
e) additional parameters configured to provide flexible use of the filter.

* * * * *